Feb. 2, 1932. L. F. BAKER 1,843,755
COMBINATION TOOL
Filed Sept. 20, 1929
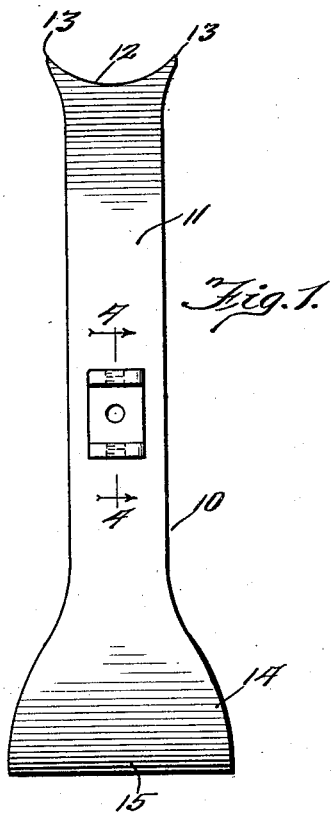
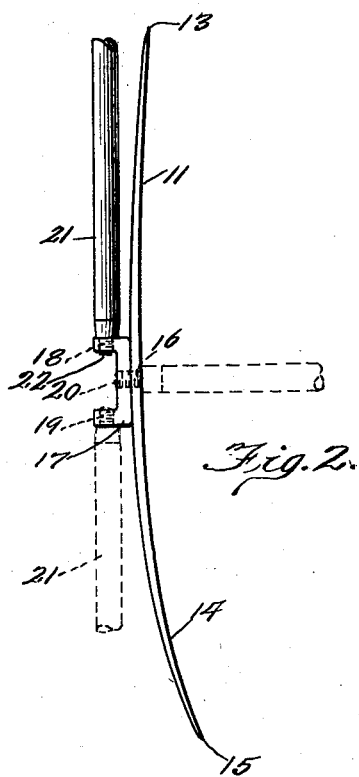
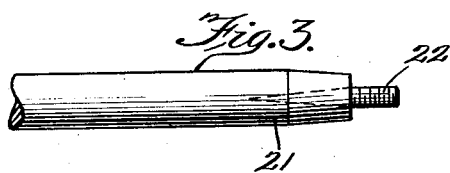
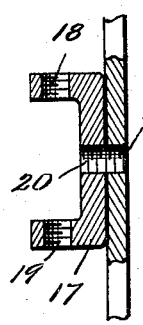
Inventor.
Leo F. Baker Patented Feb. 2, 1932

1,843,755

UNITED STATES PATENT OFFICE

LEO F. BAKER, OF FORT DODGE, IOWA, ASSIGNOR OF ONE-HALF TO A. W. MANDELKO, OF WEBSTER COUNTY, IOWA

COMBINATION TOOL

Application filed September 20, 1929. Serial No. 394,002.

This invention relates to a combination tool, and is especially related to a garden implement adapted for several uses, such for example, as a dandelion extractor, a hoe, a turf edger, snow scraper, and the like.

The main object of this invention is to provide a device of the character described adapted for several uses around a farm or home, which may be easily constructed along lines convenient for low cost manufacturing, and which will be simple in operation and highly efficient for carrying out the purposes for which it is designed.

Another object of this invention is to provide a combination implement of the character described, comprising a blade provided with suitable cutting edges adapted for various purposes, and a handle receiving means permanently secured to said blade, intermediate the ends thereof, adapted for permitting the attachment of said handle to said blade in a plurality of different relations to each other.

A further object of this invention is to provide a device of the character described, comprising a blade having a substantially straight flat edge at one end thereof adapted for use as a hoe, ice scraper, or the like, and a curved bit at the other end thereof adapted for use as dandelion extractor, a means provided intermediate the end of said blade for receiving in detachable engagement a suitable handle for said blade, said handle being adapted for being secured to said blade in a plurality of positions relative to said blade.

With the foregoing and other objects in view, which will appear as the description proceeds, the invention consists in certain novel features of construction, arrangements and combination of parts, hereinafter more fully described, illustrated in the accompanying drawings and particularly pointed out in the appended claim, it being understood that various changes in the form, proportion, size, and minor details of the structure may be made without departing from the spirit or sacrificing any of the advantages of the invention.

Stated generally, the invention comprises a blade, slightly curved along its length and constructed of any suitable material, such as steel or the like. The said blade is provided with a central body portion having a centrally disposed screw threaded opening extending therethrough, and a pair of relatively sharp portions at the ends thereof. One of said sharp portions is somewhat enlarged in width, and is provided with a substantially straight edge and the other of said sharp portions is concave, the ends thereof forming a pair of relatively sharp corners. Rigidly secured to said blade intermediate the ends thereof is a channel shaped bracket provided with a central opening in the vertical side thereof which is adapted to register with the central opening provided in the body portion of said blade and other screw threaded openings in each of the horizontal sides thereof, a suitable handle having a screw threaded stud at one end thereof adapted for reception within the aforementioned openings is provided, said handle being adapted for detachable engagement with said blade in a plurality of operative positions, whereby the use to which the blade may be subjected is dependent upon the position of the handle with relation to the said blade.

For the purpose of facilitating an understanding of my invention, I have illustrated in the accompanying drawings, a preferred embodiment thereof from an inspection of which, when considered in connection with the following description, my invention, its mode of construction, and many of its advantages should be readily understood and appreciated.

Referring to the drawings, in which similar characters of reference are employed to indicate corresponding parts throughout the several figures of the drawings:

Fig. 1 is a front elevational view of a blade embodying the present invention;

Fig. 2 is a side elevational view of the same, showing the handle attached thereto in a plurality of operative positions;

Fig. 3 is a side elevational view of a portion of the handle showing the means provided therein for securing the same to the blade; and Fig. 4 is a fragmentary sectional view taken on line 4—4 of Fig. 1.

Referring to the drawings more specifically by characters of reference, the numeral 10, designates generally a blade of elongated formation and curved slightly along the full length thereof. The said blade may be constructed of any suitable material, such for example as steel, or the like, and comprises a body portion 11, a concave or crescent shaped bit portion 12, at one end thereof, the ends of said bit portion terminating in relatively sharp corners or points 13, and an enlarged portion 14, at the other end thereof, said portion 14 being provided with a suitable sharp straight edge 15, for a purpose to be presently described. Obviously the said blade may be of some other suitable configuration, however, the shape and design illustrated in the drawings will provide the proper strength and will be highly efficient for the uses for which the same is designed.

Provided on the blade 10, intermediate the ends thereof, is a centrally disposed screw threaded opening 16. Adjacent the opening 16, on the convex side of the blade is permanently and rigidly secured, by means of welding, or in any other suitable manner, a channel shaped bracket 17, the vertically disposed side of which is provided with a suitable screw threaded opening 20, which is adapted to register with the opening 16, in the blade, to form a continuous threaded opening through said blade and bracket. Each of the other two sides of the bracket 17, is also provided with suitable screw threaded openings as shown 18 and 19, each of said openings being centrally disposed in said side portions. The size and shape of the said openings 18 and 19, is similar to the size of the opening 16, whereby the same member will be readily received in all of said openings and held therein in operative position.

A suitable handle 21, of any desired material, such as wood or the like, and of suitable shape and size is provided with a stud 22, having a pointed edge adapted for reception into the end of the handle, whereby said stud will be permanently secured to said handle. The projecting edge of said stud being externally threaded, and is adapted for threaded engagement within either of the openings 16, 18, or 19.

In practice, when it is desired to use the device for the purpose of extracting dandelions, or the like, the handle 21, is secured in operative position on the blade 10, in the opening 19, and when in this position the bit 12, may be manipulated for cutting the root of the dandelion below the surface of the ground, and the same may be then lifted out of the ground with either one of the sharp corners 13. It will thus be noted that a very handy and efficient tool is provided for this purpose.

When the end of the handle is disposed in the openings 16 and 20, the device is adapted for use as an ordinary garden hoe, the straight edge 14, thereof being used for that purpose. The other position of the handle being when the same is secured in the opening 18, and when in that position the said device makes a very handy tool for edging turf and for any other such similar purposes, as for example, for clearing or scraping snow or ice from sidewalks and the like. It will thus be noted that I have provided a combination garden implement, adapted for several uses, and which may be easily and readily converted from one use to another by merely changing the relation of the handle of said device to the blade thereof, said change being accomplished without the use of any tools, or the like.

It is believed that my invention, its mode of construction, and many of its advantages should be readily understood from the foregoing, without further description, and should also be manifest that while a preferred embodiment of the invention has been shown and described for illustrative purposes, the structural details are, nevertheless, capable of wide variation within the purview of my invention as defined in the appended claim.

What I claim and desire to secure by Letters Patent of the United States is:

An improved handle attaching means for a blade comprising a substantially channel shaped bracket adapted to be rigidly secured to a blade intermediate the ends thereof, said bracket having a centrally disposed screw threaded opening disposed in the body portion thereof and is adapted for alignment with a similar opening provided in the body portion of the blade whereby the handle may be received in threaded engagement within said aligned opening by means of which a blade may be held in operating position, each of the flanges of said channel shaped bracket being provided with centrally disposed threaded openings, the size of said openings being the same as that of the first mentioned central opening, whereby the same handle may be received in threaded engagement in either of said openings in said flanged portions for holding the said blade in other operating positions on said handle.

In testimony whereof, I affix my signature.

LEO F. BAKER.